United States Patent
Kurumatani

(10) Patent No.: US 7,458,023 B2
(45) Date of Patent: Nov. 25, 2008

(54) DATA DISPLAY SYSTEM FOR EFFICIENT DISPLAY USING XML

(75) Inventor: Akemi Kurumatani, Toyonaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 333 days.

(21) Appl. No.: 10/807,330

(22) Filed: Mar. 24, 2004

(65) Prior Publication Data

US 2005/0050457 A1    Mar. 3, 2005

(30) Foreign Application Priority Data

Aug. 29, 2003  (JP) ............................. 2003-307107
Feb. 10, 2004  (JP) ............................. 2004-033526

(51) Int. Cl.
G06F 15/00    (2006.01)
G06F 17/00    (2006.01)

(52) U.S. Cl. ...................... 715/242; 715/248; 715/249; 715/250; 715/253; 715/277; 715/235

(58) Field of Classification Search ................ 715/522, 715/0.513, 523
See application file for complete search history.

(56) References Cited

U.S. PATENT DOCUMENTS

| | | | |
|---|---|---|---|
| 2001/0044809 A1* | 11/2001 | Parasnis et al. | 707/513 |
| 2002/0049603 A1* | 4/2002 | Mehra et al. | 705/1 |
| 2002/0143821 A1* | 10/2002 | Jakubowski | 707/522 |
| 2002/0147749 A1* | 10/2002 | Ortiz et al. | 707/523 |
| 2003/0037076 A1* | 2/2003 | Bravery et al. | 707/517 |
| 2003/0225829 A1* | 12/2003 | Pena et al. | 709/203 |
| 2004/0049574 A1* | 3/2004 | Watson et al. | 709/224 |
| 2004/0268229 A1* | 12/2004 | Paoli et al. | 715/508 |
| 2004/0268249 A1* | 12/2004 | Fennelly et al. | 715/523 |

FOREIGN PATENT DOCUMENTS

JP    2001-273228    10/2001

(Continued)

OTHER PUBLICATIONS

Ecolore; Various screen shots and source code from the Ecolore website (ecolore.leeds.ac.uk/xml/links/glossaries.xml); Jul. 2003 [specific dates provided by WaybackMachine printouts]; glossaries.xml, glossaries_en.xml, glossaries_el.xml, glossaries.xml?lang=en, glossaries.xml?lang=el.*

(Continued)

*Primary Examiner*—Doug Hutton
*Assistant Examiner*—Nathan Hillery
(74) *Attorney, Agent, or Firm*—Buchanan Ingersoll & Rooney PC

(57) ABSTRACT

A data display system capable of reducing amount of data necessary for display and reducing the number of files to be prepared beforehand has the following configuration. In a server, language data files as a plurality of XML files corresponding to a plurality of languages respectively, an XML file defining file names of the language files as data, and an XSLT file for switching the file used for display among the plurality of language data files by using the XML file defining the file names are stored, and only the necessary language data file is downloaded to a browser and displayed.

16 Claims, 25 Drawing Sheets

FOREIGN PATENT DOCUMENTS

| JP | 2001-290812 | 10/2001 |
|----|-------------|---------|
| JP | 2002-175297 | 6/2002  |

OTHER PUBLICATIONS

Maddy, rick; Multi-language support and multiple resource files; Sep. 20, 2000; Stylus Studio.*

Wellnhofer, Nick; Multilingual websites with XSLT; Jul. 14, 2002; http://p2p.wrox.com/archive/xslt/2002-07/49.asp.*

Menke, Laura; An XSLT style sheet and an XML dictionary approach to internalization; Apr. 1, 2001.*

Kalani, Amit; Kalani, Priti; Developing and Implementing Web Applications with Visual C#® .NET and Visual Studio® .NET Exam Cram™ 2 (Exam 70-315); Pub Date: Aug. 20, 2003; pp. 1-9.*

Partial translation of JP2001290812 as cited by applicant.*

* cited by examiner

FIG.5

XML1(English.xml)

```
<MFP>
 <Title>Print</Title>
 <Select>
  <item>Enable</item>
  <item>Disable</item>
 </Select>
</MFP>
```

FIG.6

XML2(Japanese.xml)

```
<MFP>
 <Title>プリント</Title>
 <Select>
  <item>有効</item>
  <item>無効</item>
 </Select>
</MFP>
```

FIG.7

XML3(Language.xml)

```
<?xml version="1.0"?>
<?xml-stylesheet href="language.xsl" type="text/xsl"?>
<MFP>
 <Set>1</Set>
 <Language>English.xml</Language>
 <Language>Japanese.xml</Language>
</MFP>
```

WHEN ENGLIGH IS SELECTED, SET TO 1, AND WHEN JAPANESE IS SELECTED, SET TO 2.

FIG.8

XSLT(Language.xsl)

```
<?xml version="1.0" encoding="UTF-8"?>
<xsl:stylesheet xmlns:xsl=http://www.w3.org/1999/XSL/Transform version="1.0">
<xsl:output method="html" encoding="UTF-8"/>
<xsl:variable name="Language">
    <xsl:value-of select=
        "document('Language.xml')//Language[position()=number(/MFP/Set)]"/>      (1)
</xsl:variable>
<HTML>
<BODY>
<TABLE>
    <TR>
        <TD>NetWare Print</TD>
        <TD>
        <select size="1">
            <xsl:for-each select="document($Language)//MFP/item">               (2)
            <option>
                <xsl:value-of select="."/>
            </option>
            </xsl:for-each>
        </select>
        </TD>
    </TR>
</TABLE>
</BODY>
</HTML>
</xsl:stylesheet>
```

(1) LANGUAGE FILE OF THE CURRENTLY SET LANGUAGE IS AUTOMATICALLY SELECTED.

FIG.12

```
<TABLE>
<TR>
    <TD>Language</TD>
    <TD>
        <select size="1">
            <xsl:for-each select="document('language.xml')/MFP/Language">
                <option>
                    <xsl:value-of select="substring-before(.,'.xml')"/>
                </option>
            </xsl:for-each>
        </select>
    </TD>
</TR>
</TABLE>
```

STRING OF CHARACTERS PRECEDING ".xml" OF DATA AT <Language> TAG IS OUTPUT

FIG.13

Folder1.xml (INFORMATION OF THE FILE STORED IN Folder1)

```
<MFP>
  <File>
    <FileName>Jane.tif</FileName>
    <ReceiveTime>2003/7/4 9:30</ReceiveTime>
    <FileSize>255</FileSize>
  </File>
  <File>
    <FileName>Map/jpg</FileName>
    <ReceiveTime>2003/7/5 14:00</ReceiveTime>
    <FileSize>300</FileSize>
</MFP>
```

FIG.14

Folder2.xml (INFORMATION OF THE FILE STORED IN Folder2)

```
<MFP>
  <File>
    <FileName>test.tif</FileName>
    <ReceiveTime>2003/7/3 10:00</ReceiveTime>
    <FileSize>255</FileSize>
  </File>
  <File>
    <FileName>example.jpg</FileName>
    <ReceiveTime>2003/7/6 13:00</ReceiveTime>
    <FileSIze>300</FileSize>
</MFP>
```

FIG.15

BoxList.xml

```
<?xml version="1.0">
<?xml-stylesheet href="BoxList.xsl" type="text/xsl"?>
<MFP>
 <Set>1</Set>
 <Box>Folder1.xml</Box>
 <Box>Folder2.xml</Box>
</MFP>
```

FIG.16

STYLE SHEET (BoxList.xsl)

```
<?xml version="1.0" encoding="UTF-8"?>
<xsl:stylesheet xmlns:xsl=http://www.w3.org/1999/XSL/Transform version="1.0">
<xsl:output method="html" encoding="UTF-8"/>
<xsl:variable name="Box">
   <xsl:value-of select=
       "document('BoxList.xml')//Box[position()=number(/MFP/Set)]"/>
</xsl:variable>
<HTML>
<BODY>
 <TABLE id="BoxList" style="display:block">
        <TR><TD>Folder1</TD></TR>              ⎫
        <TR><TD>Folder2</TD></TR>              ⎬ *1
                                               ⎭
 </TABLE>
 <TABLE id="BoxInfo" style="display:none">
   <TR>
        <TD>File Name</TD>
        <TD>Received Time</TD>
        <TD>File Size</TD>
   </TR>
   <xsl:for-each select="document($Box)/MFP/File">
   <TR>
        <TD><xsl:value-of select="FileName"/></TD>
        <TD><xsl:value-of select="ReceivedTime"/></TD>
        <TD><xsl:value-of select="FileSize"/></TD>
   </TR>
   </xsl:for-each>
 </TABLE>
</BODY>
</xsl:stylesheet>
```

FIG.19

ONE EXAMPLE (BoxList2.xml)

```xml
<?xml version="1.0">
<?xml-stylesheet href="BoxList2.xsl" type="text/xsl"?>
<MFP>
  <Set>1</Set>
  <Folder>
    <Name>Mike</Name>
    <Box>Folder1.xml</Box>
  </Folder>
  <Folder>
    <Name>Jane</Name>
    <Box>Folder2.xml</Box>
  </Folder>
</MFP>
```

FIG.20

STYLE SHEET (BoxList2.xsl)

```xml
<?xml version="1.0" encoding="UTF-8"?>
<xsl:stylesheet xmlns:xsl=http://www.w3.org/1999/XSL/Transform version="1.0">
<xsl:output method="html" encoding="UTF-8"/>
<xsl:variable name="Box">
  <xsl:value-of select=
      "document('BoxList.xml')//Box[position()=number(/MFP/Set)]"/>
</xsl:variable>
<HTML>
<BODY>
 <TABLE id="BoxList" style="display:block">
    <xsl:for-each select="Folder">
    <TR><TD><xsl:value-of select="Name"/></TD></TR>
    </xsl:for-each>
 </TABLE>
 <TABLE id="BoxInfo" style="display:none">
   <TR>
        <TD>File Name</TD>
        <TD>Received Time</TD>
        <TD>File Size</TD>
   </TR>
   <xsl:for-each select="document($Box)/MFP/File">
   <TR>
        <TD><xsl:value-of select="FileName"/></TD>
        <TD><xsl:value-of select="ReceivedTime"/></TD>
        <TD><xsl:value-of select="FileSize"/></TD>
   </TR>
   </xsl:for-each>
 </TABLE>
</BODY>
</xsl:stylesheet>
```

EXEMPLARY DISPLAY

FIG.25

XML1(English.xml)

```
<MFP>
   <Print>Print</Print>
   <Status>
      <Item data="Ready">Ready</Item>
      <Item data="Error">Error</Item>
   </Status>
   <Select>
      <Item data="Enable">Enable</item>
      <Item data="Disable">Disable</item>
   </Select>
</MFP>
```

FIG.26

XML2(Japanese.xml)

```
<MFP>
   <Print>プリント</Print>
   <Status>
      <Item data="Ready">レディ</Item>
      <Item data="Error">エラー</Item>
   </Status>
   <Select>
      <Item data="Enable">有効 </Item>
      <Item data="Disable">無効</Item>
   </Select>
</MFP>
```

FIG.27

XML3(Language.xml)

```
<MFP>
    <Set>1</Set>
    <Language>English.xml</Language>
    <Language>Japanese.xml</Language>
</MFP>
```

WHEN ENGLIGH IS SELECTED, SET TO 1, AND WHEN JAPANESE IS SELECTED, SET TO 2.

FIG.28

DATA1(data.xml)

```
<?xml version="1.0">
<?xml-stylesheet href="data.xsl" type="text/xsl"?>
<MFP>
 <Print>
  <Status>Ready</Status>
  <Function>Enable</Function>
 </Print>
</MFP>
```

FIG.29

XSLT(data.xsl)

```
<?xml version="1.0" encoding="UTF-8"?>
<xsl:stylesheet xmlns:xsl=http://www.w3.org/1999/XSL/Transform version="1.0">
<xsl:output method="html" encoding="UTF-8"/>
<xsl:variable name="Language">
   <xsl:value-of select=
      "document('Language.xml')//Language[position()=number(/MFP/Set)]"/>   ← (1)
</xsl:variable>
<HTML>
<BODY>
  <TABLE>
     <TR>
        <TD>
           <xsl:value-of select="document($Language)//MFP/Print"/>   ← (2)
        </TD>
     </TR>
     <TR>
        <TD>
           <xsl:variable name="X"><xsl:value-of select="MFP/Print/Status"/></xsl:variable>   ← (3)
           <xsl:variable-of select="document($Language)//MFP/Status/Item[@data=$X]"/>   ← (4)
        </TD>

<TD>
(5) →   <xsl:variable name="Y"><xsl:value-of select="MFP/Print/Function"/></xsl:variable>
           <select size="1">
              ⎡ <xsl:for-each select="document($Language)//MFP/Select/Item">
              ⎢ <option>
              ⎢ <xsl:if test="@data=$Y">
         (6) ⎨    <xsl:attribute name="selected">selected</xsl:attribute>
              ⎢ </xsl:if>
              ⎢ <xsl:value-of select="."/>
              ⎢ </option>
              ⎣ </xsl:for-each>
           </select>
        </TD>
     </TR>
  </TABLE>
</BODY>
</xsl:stylesheet>
```

(1) LANGUAGE FILE OF THE CURRENTLY SET LANGUAGE IS AUTOMATICALLY SELECTED.

"Ready" IS STORED IN VARIABLE X

DISPLAY CONTENTS OF Item TAG OF WHICH ATTRIBUTE data IS VARIABLE X

LOOK VALUE OF Function TAG OF DATA1, AND PRESENT PRESELECTED DISPLAY ON SELECT BOX.

FIG.31

XML1(User.xml)

```
<MFP>
    <Check>
        <ErrorItem>
            <Item name="IPAdd">IP address</Item>
            <Item name="SubnetMask">Subnet Mask</Item>
        </ErrorItem>
        <Message>
            <Item name="Ok_1">Complete</Item>
            <Item name="Str_1">Not input yet</Item>
            <Item name="Str_2">Number of characters too large</Item>
            <Item name="Str_3">Input character not correct</Item>
            <Item name="Err_2">Internal error</Item>
        </Message>
    </Check>
</MFP>
```

FIG.32

XML2(Admin.xml)

```
<MFP>
    <Check>
        <ErrorItem>
            <Item name="IPAdd">IP address</Item>
            <Item name="SubnetMask">Subnet Mask</Item>
        </ErrorItem>
        <Message>
            <Item name="Ok_1">Complete</Item>
            <Item name="Str_1">Not input yet. Input absolutely necessary.</Item>
            <Item name="Str_2">Number of input characters exceeds available number.</Item>
            <Item name="Str_3">
                Characters not settable included. Only numerals and period can be input.
            </Item>
            <Item name="Err_2">
                Internal error occurred. Set again.
            </Item>
        </Message>
    </Check>
</MFP>
```

FIG.33

XML3(System.xml)

```
<MFP>
    <Set>1</Set>
    <Kind>User.xml</Kind>
    <Kind>Admin.xml</Kind>
</MFP>
```

FIG.34

DATA1(error.xml)

```
<?xml version="1.0" encoding="UTF-8"?>
<?xml-stylesheet href="Error.xsl" type="text/xsl"?>
<MFP>
    <Message>
        <Item Code="Str_1">IPAdd</Item>
        <Item Code="Str_3">SubnetMask</Item>
    </Message>
</MFP>
```

FIG.35

XSLT(Error.xsl)

```
<?xml version="1.0" encoding="UTF-8"?>
<xsl:stylesheet xmlns:xsl=http://www.w3.org/1999/XSL/Transform version="1.0">
<xsl:output method="html" encoding="UTF-8"/>
<xsl:variable name="Display">
  <xsl:value-of select=
  "document('System.xml')//Kind[position()=number(/MFP/Set)]"/>   ← (1)
</xsl:variable>
<HTML>
<BODY>
<table valign="top" width="510px" align="center">
<tr>
  <th height="50px" align="left"><xsl:value-of select="$Fix/Error/Message"/></th>
</tr>
<xsl:for-each select="Message/Item">
<xsl:variable name="Me"><xsl:value-of select="."/></xsl:variable>  } (2)
                 <STORE VALUE OF Item TAG OF !—error.xml TO VARIABLE Me→
<xsl:variable name="Co"><xsl:value-of select="@Code"/></xsl:variable>   ← (3)
                 <STORE ATTRIBUTE Code VALUE OF Item TAG OF !—error.xml TO VARIABLE Co→
                 ┌──────────────────┐
                 │ User.xml IS STORED│
                 └──────────────────┘
<tr>
  <td width="210px">
(4) →  <xsl:value-of select="document($Display)/MFP/Check/ErrorItem/Item[@name=$Me]"/></td>
  <td width="300px">
(5) →  <xsl:value-of select="document($Display)/MFP/Check/Message/Item[@name=$Co]"/></td>
</tr>
</xsl:for-each>
</table>
```

FIG.36

| IP address | Not input yet |
| Subnet mask | Input character not correct |

DATA DISPLAY SYSTEM FOR EFFICIENT DISPLAY USING XML

This application is based on Japanese Patent Applications Nos. 2003-307107 and 2004-033526 filed with Japanese Patent Office on Aug. 29, 2003 and Feb. 10, 2004, respectively, the entire content of which is hereby incorporated by reference.

BACKGROUND OF THE INVENTION

1. Field of the Invention

The present invention relates to a data display system, a data output apparatus, an image forming apparatus, a data display apparatus and a data display program. More specifically, the present invention relates to a data display system, a data output apparatus, an image forming apparatus, a data display apparatus and a data display program for displaying and outputting data of a WEB page and the like using a data definition file such as XML (extensible markup language) and a style definition file such as XSLT (XSL (extensible stylesheet language) transformations).

2. Description of the Related Art

Conventionally, a technique of transmitting data from one device to another device in a network environment and displaying the data there has been known. By way of example, such a technique is employed in a system in which a device status is transmitted from the device of interest to a PC (personal computer) connected to a network and the status is displayed using a browser software on the PC or the device status is determined.

When a display is to be given in such a system, language for display or items to be displayed may be changed. When WEB pages are described in HTML (hypertext markup language), pages described in HTML language-by-language and item-by-item to be displayed are stored and necessary page or pages are transmitted upon request. When WEB pages are described in XML and XSLT, a plurality of page sets of XML and XSLT are prepared, stored in a server or the like, and necessary pages are transmitted upon request, as in the case of HTML.

In a system in which a PC connected to a network displays or sets a status of another device connected to the network, every time a user requests to change display language, it is necessary to transmit an HTML page or the like prepared in the requested language.

Similarly, when XML and XSLT are used, it is necessary to transmit the object XSLT and XML upon request.

In connection with the above described technique, Japanese Patent Laying-Open No. 2002-175297 discloses a technique in which a plurality of information resources are arbitrarily defined in accordance with an object of management and displayed on a WEB browser.

The conventional technique described above, however, has a problem that a large number of files must be downloaded at the time of display (or a change of display). Further, it is necessary to prepare in advance a plurality of different files (for example, files in each of a plurality of languages), and therefore, there is a formidable burden on the user to prepare and maintain the files.

SUMMARY OF THE INVENTION

The present invention was made to solve the above described problem, and an object is to provide a data display system, a data output apparatus, an image forming apparatus, a data display apparatus and a data display program that can reduce the amount of data necessary for display and can alleviate the burden on the user of preparing and maintaining the data.

In order to attain the above described object, according to an aspect, the present invention provides a data display system having a client computer and a server connected through a network, including: a first memory storing a plurality of data definition files of a first type defining contents of data to be displayed on the client computer; a second memory storing a data definition file of a second type defining, as data, file names of the data definition files of the first type; a third memory storing a style definition file, defining a style for displaying a data definition file, and switching a file to be displayed among the plurality of data definition files of the first type by using the data definition file of the second type; and a display displaying data on the client computer using the files stored in the first, second and third memories.

According to another aspect, the present invention provides a data output apparatus performing at least one of display output and external output of data, including: a first memory storing a plurality of data definition files of a first type defining contents of data to be displayed; a second memory storing a data definition file of a second type defining, as data, file names of the data definition files of the first type; a third memory storing a style definition file, defining a style for displaying a data definition file, and switching a file to be displayed among the plurality of data definition files of the first type by using the data definition file of the second type; and an output equipment outputting data using the files stored in the first, second and third memories.

According to a further aspect, the present invention provides a data display apparatus displaying data downloaded from a server, wherein the server stores a plurality of data definition files of a first type defining contents of data to be displayed, a data definition file of a second type defining, as data, file names of the data definition files of the first type, and a style definition file, defining a style for displaying a data definition file, and switching a file to be displayed among the plurality of data definition files of the first type by using the data definition file of the second type, the data display apparatus including a receiver receiving a file necessary for display among the data definition files of the first type, by using the style definition file and the data definition file of the second type, and a display presenting a display using the file received by the receiver.

According to a still further aspect, the present invention provides a data display program displaying data downloaded from a server, wherein the server stores a plurality of data definition files of a first type defining contents of data to be displayed, a data definition file of a second type defining, as data, file names of the data definition files of the first type, and a style definition file, defining a style for displaying a data definition file, and switching a file to be displayed among the plurality of data definition files of the first type by using the data definition file of the second type; the data display program causing a computer to execute a receiving step of receiving a file necessary for display among the data definition files of the first type, by using the style definition file and the data definition file of the second type, and a display step of presenting a display using the file received in the receiving step.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5 and 6 show specific examples of a language data file D1 recorded in MFP 100.

FIG. 7 shows a specific example of a setting file D2 recorded in MFP 100.

FIG. 8 shows a specific example of a style definition file D3 recorded in MFP 100.

FIG. 12 represents style information to display the language selection list shown in FIG. 11.

FIGS. 13 and 14 represent information of files contained in a folder of a hard disk.

FIG. 15 shows a specific example of a setting file to select the file of FIG. 13 or FIG. 14.

FIG. 16 shows a specific example of an XSLT file by which the file of FIG. 13 or FIG. 14 can be selected through the setting file of FIG. 15.

FIG. 19 shows a specific example of a setting file for selecting the file of FIG. 13 or FIG. 14.

FIG. 20 shows a specific example of an XSLT file that can select the file of FIG. 13 or FIG. 14 through the setting file of FIG. 19.

FIGS. 25 and 26 show specific examples of a language data file D1 stored in MFP 100.

FIG. 27 shows a specific example of a setting file D2 recorded in MFP 100.

FIG. 28 shows a specific example of a device status file recorded in MFP 100.

FIG. 29 shows a specific example of a style definition file D3 recorded in MFP 100.

FIGS. 31 and 32 show specific examples of error message data file stored in a device.

FIG. 33 shows a specific example of a setting file D2 stored in a device.

FIG. 34 shows a specific example of a device status file D4 stored in a device.

FIG. 35 shows a specific example of a style definition file D3 stored in a device.

FIG. 36 shows an exemplary display given through the files of FIGS. 31 to 35.

DESCRIPTION OF THE PREFERRED EMBODIMENTS

Embodiments of the present invention will be described in the following with reference to the figures.

Figure 1:
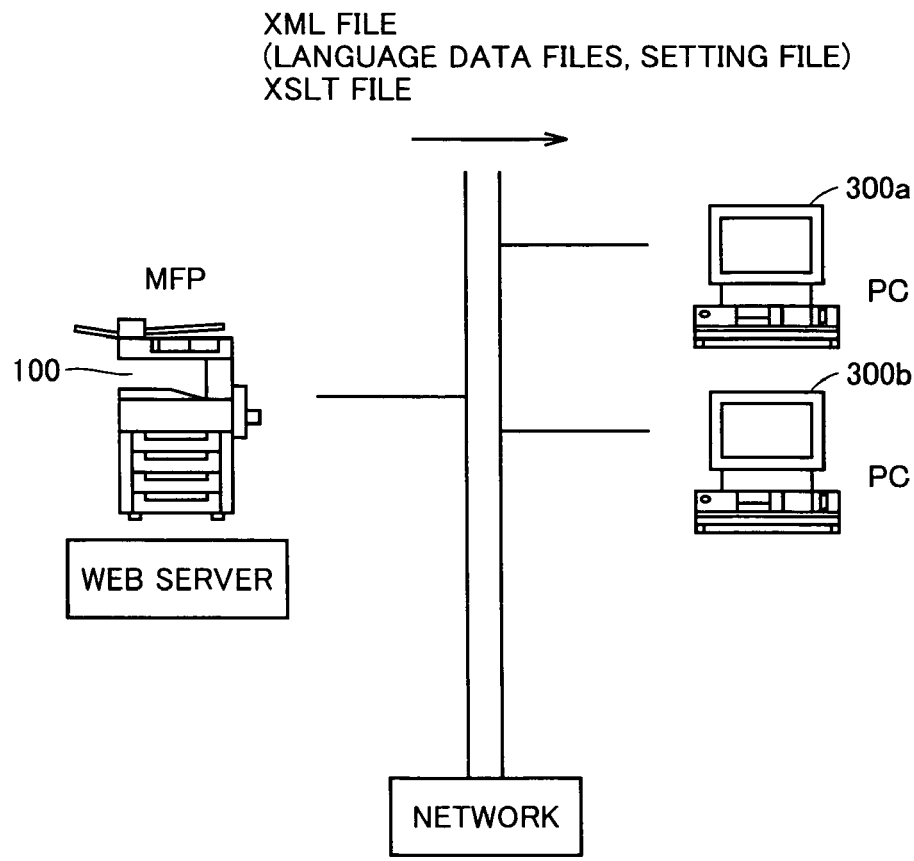
FIG. 1 represents a configuration of a network system in accordance with one embodiment of the present invention.

FIG. 1 represents a configuration of a network system in accordance with one embodiment of the present invention.

Referring to FIG. 1, the present system includes an MFP (Multi Function Peripherals) 100 and client PCs 300a and 300b, connected to a network. Management information including status of operation of MFP 100 and method of paper feed is transmitted over the network using XML and XSLT, and displayed on a browser of PCs 300a and 300b. More specifically, in response to a request from PC 300a or 300b, MFP 100 transmits XML files (language data file and setting file) and an XSLT file to PC 300a or 300b. Based on the transmitted files, browser software of PC 300a or 300b displays the management information of MFP 100.

MFP 100 stores WEB pages formed by XML and XSLT, and file names of XML data to be referred to are recorded as XML data. Therefore, it is possible to change the display of a WEB page without changing the contents of XSLT.

More specifically, in MFP 100, a plurality of XML files defining, by XML, items to be displayed by the browser, an XML file (setting file) defining names of these files as XML data, and an XSLT file (style definition file) having a mechanism to switch the defined files are recorded, and hence, it has a function of switching the file to be used by XSLT.

Figure 2:
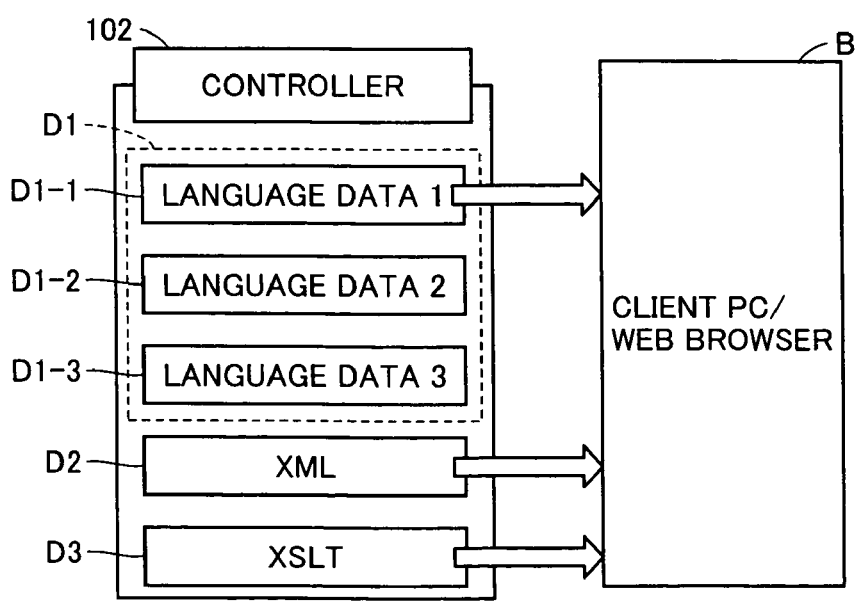
FIG. 2 schematically shows flow of information transmitted from MFP 100 to PCs 300a and 300b shown in FIG. 1.

FIG. 2 schematically shows flow of information transmitted from MFP 100 to PCs 300a and 300b.

Referring to the figure, MFP 100 has a controller 102, and using a WWW server, transmits management data of MFP 100 to a browser B of PC 300a or 300b, in the XML and XSLT forms. MFP 100 has language data files D1 (XML files), a setting file D2 (XML file) and a style definition file D3 (XSLT file). There are a plurality of language data files D1, in order to handle a plurality of languages (language data files D1-1, D1-2, D1-3).

Data transmitted from MFP 100 to PC 300a or 300b includes setting file D2, style definition file D3 and one of language data files D1.

When MFP 100 is accessed by the browser B, browser B first identifies style definition file D3 and checks the contents of setting file D2, so as to select a necessary language data file from the plurality of language data files, and takes in setting file D2, style definition file D3 and only the necessary language data file D1 to PC 300a or 300b.

Figure 3:
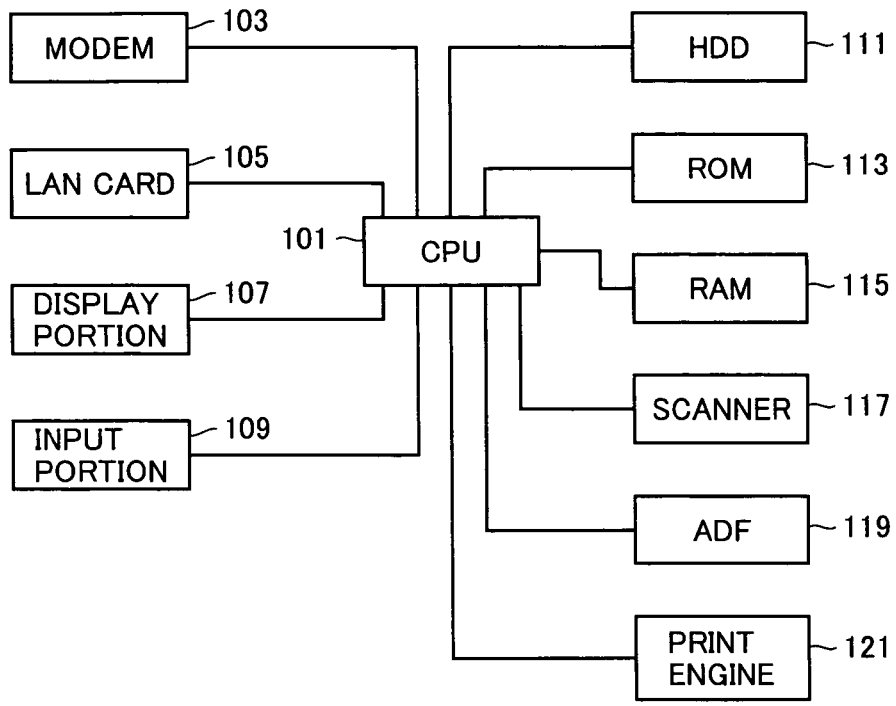
FIG. 3 is a block diagram representing a hardware configuration of MFP 100 show in FIG. 1.

FIG. 3 is a block diagram representing a hardware configuration of MFP 100 shown in FIG. 1.

Referring to the figure, MFP 100 includes a CPU 101 controlling the overall apparatus, a modem 103 for connection to a public line, an LAN card 105 for connection to the Internet or to an LAN, a display portion 107 for displaying necessary information to the user, an input portion 109 including a key and the like operated by the user for inputting information necessary for operation of the apparatus, a hard disk drive 111 storing image data, XML and XSLT files, an ROM 113 storing a program and the like, an RAM 115 for temporarily storing data, a scanner 117 for reading an original, an automatic document feeder ADF 119, and a print engine 121 for printing image data.

Figure 4:
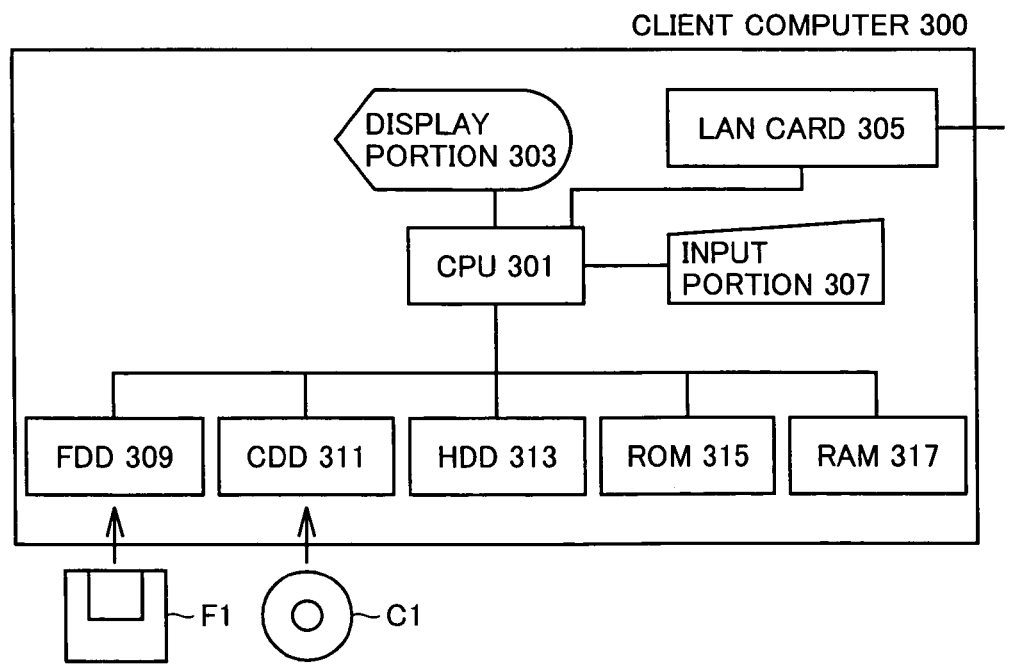
FIG. 4 is a block diagram representing a hardware configuration of one of PCs 300a and 300b shown in FIG. 1.

FIG. 4 is a block diagram representing a hardware configuration of one of PCs 300*a* and 300*b* shown in FIG. 1.

Referring to the figure, the PC includes a CPU 301 for overall control of the apparatus, a display portion 303, an LAN card 305 for connection to an LAN, an input portion 307 including a keyboard, a mouse and the like, a flexible disc drive 309, a CD-ROM drive 311, a hard disk drive 313, an ROM 315 and an RAM 317.

Flexible disk drive 309 allows reading of image data or a program recorded on a flexible disk (F1), and CD-ROM drive 311 allows reading of image data or a program recorded on a CD-ROM (C1).

FIGS. 5 and 6 show specific examples of language data file D1 recorded in MFP 100.

The files of FIGS. 5 and 6 will be referred to as XML1 and XML2 here, and the file names are assumed to be "English.xml" and "Japanese.xml", respectively.

XML1 shown in FIG. 5 is a file for displaying a menu written in English, and XML2 shown in FIG. 6 is a file for displaying a menu written in Japanese.

Specifically, words "Print", "Enable" and "Disable" used for menu display in FIG. 5 are replaced by Japanese words "プリント", "有効" and "無効" in FIG. 6. By using either of these two language data files, it is possible to display a menu in English or Japanese.

Though two language data files are used here, other language data files such as Chinese or French may be prepared separately and added to the language data files, and the number of language data files is not limited.

FIG. 7 shows a specific example of setting file D2 recorded in MFP 100.

The file of FIG. 7 is referred to as XML3 here, of which name is assumed to be "Langugage.xml."

Referring to the figure, the numeral portion of <Set>1</Set> in the setting file represents language file of which order is to be displayed next. When English is selected, "1" is recorded, and when Japanese is selected, "2" is recorded.

The portion between the tags <Language> and </Language>, file name of the language data file (FIGS. 5 and 6) is recorded, which enables selection of the language data file to be used for display.

FIG. 8 shows a specific example of style definition file D3 recorded in MFP 100.

Referring to the figure, the underlined portion (1) is for automatically selecting the language data file of the currently set language. This expression (1) enables acquisition of data of the <Language> tag in the order indicated by <Set> tag of Language.xml (FIG. 7). Specifically, here, among the files indicated by <Language> tag, English.xml as the file of the first order is taken. The taken data is turned to a variable "Language", which can be utilized later as $Language.

The underlined portion (2) of FIG. 8 is for making a reference to an external XML file, using a Document function. Here, "English.xml" is in the variable "Language", and therefore, the file "English.xml" is read and the data of the file are displayed.

The number (numeral) as the data of the <Set> tag in the setting file (FIG. 7) is related to the order of <Language> tag. It is noted that in order to set the numeral in <Set> tag, CGI (common gateway interface) is used.

When English is selected by the browser, a process of transmitting the data "1" to the server, or a process of transmitting the data "English" to the server to set "1" by the determination on the side of CGI, takes place.

Figure 9:
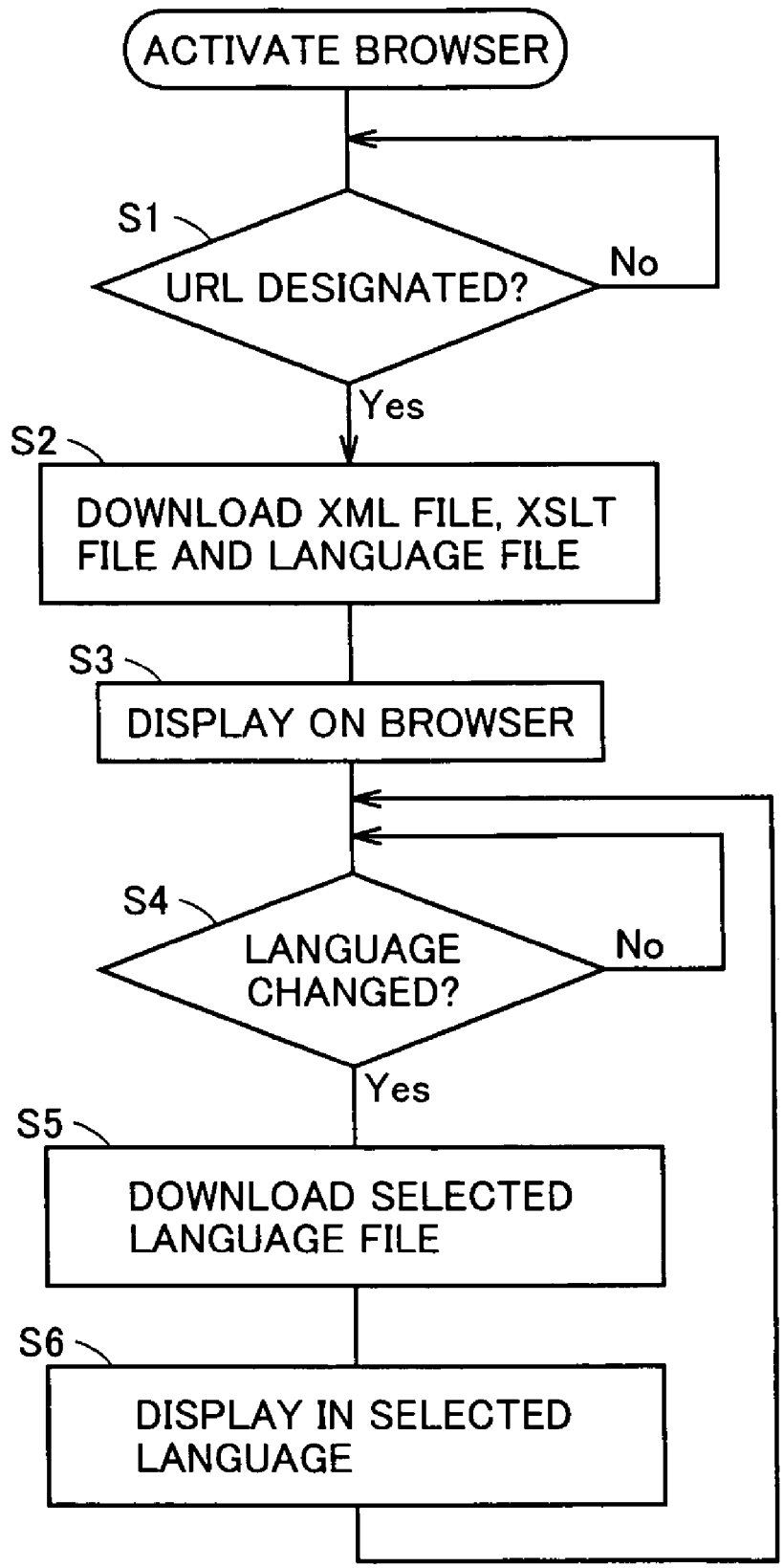
FIG. 9 is a flow chart representing a process executed by software of a browser installed in PC 300a or 300b.

FIG. 9 is a flow chart representing a process performed by the browser software installed in PC 300*a* or 300*b*.

Referring to the figure, in step S1, whether an URL is designated by a PC or not is confirmed. When an URL is designated, the flow proceeds to step S2, and the style definition file (XSLT file), setting file (XML file) and a necessary language data file (XML file) recorded at the site indicated by the URL are downloaded.

Next, data is displayed using the files downloaded in step S3.

In step S4, whether or not display language is changed by, for example, a user input is determined. If it is YES, only the language data file corresponding to the selected language is further downloaded in step S5, and data is displayed in the selected language in step S6.

Figure 10:
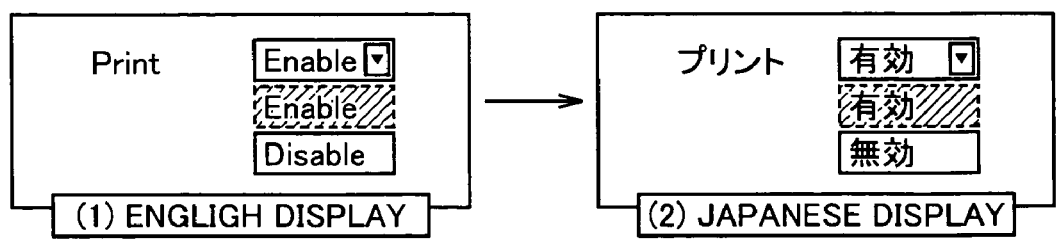
FIG. 10 shows an exemplary display on a display portion 303 of PC 300a or 300b.

FIG. 10 shows exemplary displays on display portion 303 of PC 300*a* or 300*b*.

As can be seen from "(1) English display" on the left side of FIG. 10, as "1" is set in the <Set> tag of the setting file (FIG. 7), "English.xml" indicated by the first <Language> tag is selected, and therefore, the contents of XML1 of FIG. 5 appear on the screen (English display).

When the user changes the display language from English to Japanese in this state, CGI sets "2" in the <Set> tag of the setting file (FIG. 7), and therefore, "Japanese.xml" indicated by the second <Language> tag is selected. Consequently, the contents of XML2 appear on the screen ("Japanese display" on the left side of FIG. 10). In this manner, switching of display language can be done with small amount of data.

Specifically, when English has been selected as the display language as shown in FIG. 7, XML1 (English.xml) is automatically applied as there are underlined descriptions (1) and (2) in XSLT of FIG. 8, and "(1) English display" of FIG. 10 is displayed on the screen by the browser. At this time, files necessary for display are XML1, XML3 and XSLT.

When the display language is changed to Japanese, "2" is set in the <Set> tag of XML3, and therefore, display is switched to Japanese display using XML2 (Japanese.xml) and "(2) Japanese display" of FIG. 10 is displayed on the screen by the browser, without the necessity of changing XSLT. At this time, files necessary for display are XML2, XML3 and XSLT.

Therefore, when the display language is changed from English to Japanese, the file that is newly downloaded is XML2 only. Thus, the amount of data to be transmitted can be reduced.

Figure 11:
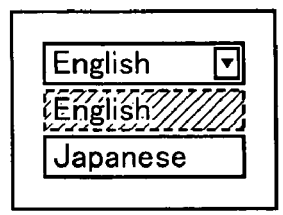
FIG. 11 shows a specific example of a language selection list (menu) displayed on display portion 303 of PC 300a or 300b.

FIG. 11 shows a specific example of the language selection list displayed on display portion 303 of PC 300*a* or 300*b*.

In the example of FIG. 11, available languages are displayed in the form of a pull-down menu, and the user may select a language to be used for display.

Parameters displayed on the screen of FIG. 11 can be obtained from the contents of the setting file (FIG. 7).

FIG. 12 represents style information for displaying the language selection list of FIG. 11. By adding the style information to the XSLT shown in FIG. 8, it becomes possible to display the menu of FIG. 11 using the setting file.

Referring to FIG. 12, by the underlined expression, a character string preceding ".xml" of the data indicated by <Language> tag of the setting file (FIG. 7) is output. Specifically, from the setting file of FIG. 7, character strings "English" and "Japanese" can be extracted and displayed as items of selection in the language selection list.

The system structured as described above is effective when a plurality of displays are to be given using one XSLT. Specifically, when the layout is the same, the contents can be changed using one XSLT.

Accordingly, in the present system, the amount of data necessary for display can be reduced, and load on the network can be alleviated. Further, a system can be provided that alleviates burden on the user of data preparation and maintenance.

[First Modification]

In the first modification, it is assumed that file information held in the hard disk drive of MFP 100 is displayed on the PC side. When the user designates a folder, names, time of storage, file size and the like of files stored in the folder are displayed, and by changing folder designation, contents to be displayed can also be changed.

FIGS. 13 and 14 represent information contained in two folders in a hard disk, corresponding to FIGS. 5 and 6, respectively. Data of FIGS. 13 and 14 are described in XML, of which file names are "Folder1.xml" and "Folder2.xml."

In the data of FIG. 13, information of "Jane.tif" and "Map.jpg", that are files stored in Folder 1 is recorded.

In the data of FIG. 14, information of "test.tif" and "example.jpg", that are files stored in Folder 2 is recorded.

FIG. 15 shows a specific example of a setting file for selecting the file of FIG. 13 or FIG. 14. The file name of the file is assumed to be BoxList.xml.

In this file also, file names of the data files of FIGS. 13 and 14 are described by <Box> tag, and therefore, by the numeral set in the <Set> tag, it is possible to determine which data file is to be used for display, as in the example of FIG. 7.

FIG. 16 shows a specific example of an XSLT file that allows selection of the file of FIG. 13 or 14, through the setting file of FIG. 15.

In this file, by the underlined expression on the sixth line, the data of the <Box> tag (Folder1.xml or Folder2.xml, and in the example of FIG. 15, Folder1.xml) in the order indicated by the <Set> tag of BoxList.xml file of FIG. 15 is obtained. By the expression on the tenth line from the bottom, the file having the file name indicated by the data of <Box> tag is read and displayed.

The expression denoted by *1 in FIG. 16 provides a list of types of folders that can be displayed (in this example, Folder 1 and Folder 2), in the form of a selection menu.

Figure 17:
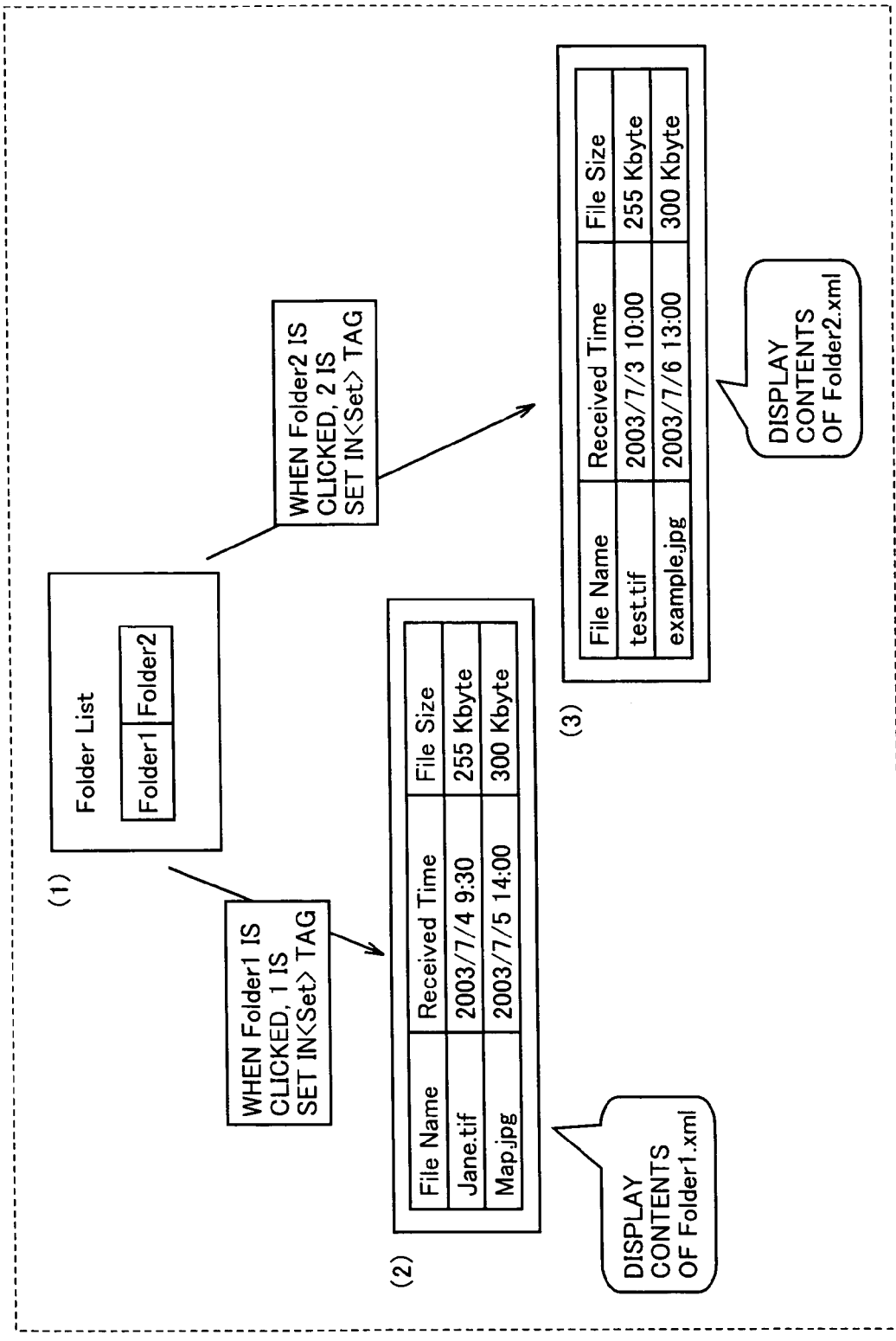
FIG. 17 represents examples of display presented by the files shown in FIGS. 13 to 16.

FIG. 17 illustrates exemplary displays given by the files shown in FIGS. 13 to 16.

By the expression denoted by *1 of the XSLT file shown in FIG. 16, a selection menu such as shown in FIG. 17 (1) is displayed. From the "Folder List," it is possible for the user to select Folder 1 or Folder 2.

When the user clicks either one of the two, "1" or "2" is set in the <Set> tag portion of the setting file (FIG. 15). Consequently, contents of "Folder1.xml" or "Folder2.xml" are displayed (see (2) or (3) of FIG. 17).

The data displayed in a list as a selection menu may be read to XSLT as represented by *1 of FIG. 16, or XML data of the setting file (FIG. 15) may be utilized to allow expansion. This provides a system that is flexible to addition of folders.

Specifically, when the file name is the same as the Folder name displayed on the selection menu of "Folder List," the selection menu can be displayed by using the data in "Box-List.xml" of FIG. 15.

Figure 18:
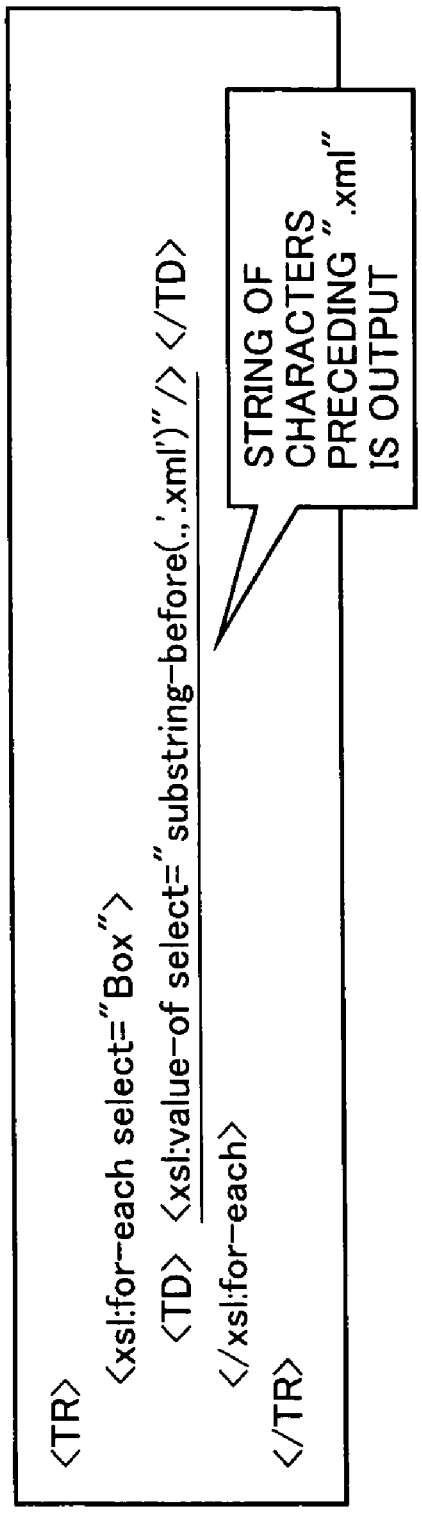
FIG. 18 shows XSLT data when a selection menu is displayed by using a setting file.

FIG. 18 shows XSLT data when the selection menu is to be displayed by using the setting file, representing the data described in place of the portion *1 of FIG. 16.

In the example of FIG. 18, by the underlined expression, a string of characters preceding ".xml" of the data at the <Box> tag of FIG. 15 is output. Therefore, even when a folder is added, what is necessary is simply to add the XML file indicated by "(folder name).xml" and XML data of BoxList.xml, and modification of XSLT is unnecessary.

[Second Modification]

A specific example in which the XML file name is made different from the Folder name to be displayed in the selection menu of "Folder List" will be described in the following.

By way of example, assume that "Mike" and "Jane" are displayed in the selection menu of "Folder List", and the contents of "Folder1.xml" and "Folder2.xml" are displayed when "Mike" and "Jane" are selected, respectively. Here, in place of Boxlist.xml and Boxlist.xsl of FIGS. 15 and 16, Boxlist2.xml and Boxlist2.xsl of FIGS. 19 and 20 are used.

Specifically, in the setting file of FIG. 19, names to be displayed on the selection menu of "Folder List" are indicated by <Name> tag, and the corresponding file names are indicated by the <Box> tag.

In accordance with the underlined expression on the sixth line of the style sheet of FIG. 20, the file name of the <Box> tag of the order indicated by the <Set> tag is read from FIG. 19. Further, by the expressions on three lines surrounded by a solid line, the name indicated by the <Name> tag is displayed as the selection menu of the "Folder List."

Figure 21:
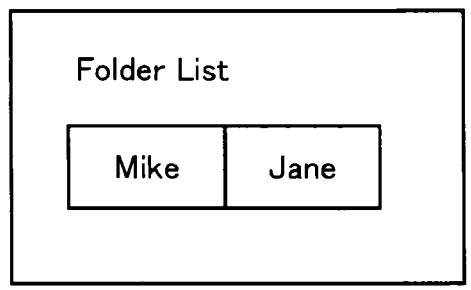
FIG. 21 shows an exemplary display of a selection menu displayed by using the files of FIGS. 19 and 20.

FIG. 21 shows an example of the selection menu displayed by using the files of FIGS. 19 and 20.

As shown in the figure, names "Mike" and "Jane" are displayed, and when these are selected, "folder1.xml" and "folder2.xml" are displayed, respectively.

In the embodiments above, a change in display language of a WEB page and a change in display of folder contents have been described. The present invention is also applicable when, by way of example, a plurality of address books are managed by a plurality of files and the address book to be displayed is changed by selection.

Specifically, when data of address books are stored in place of the data of FIGS. 13 and 14, for example, the image of FIG. 21 appearrs on the screen to allow switching of the address books for display.

[Third Modification]

Though data are downloaded from the MFP in the embodiments above, it is not limiting, and the present invention is also applicable to a system consisting of a general server such as a computer and a client.

Figure 22:
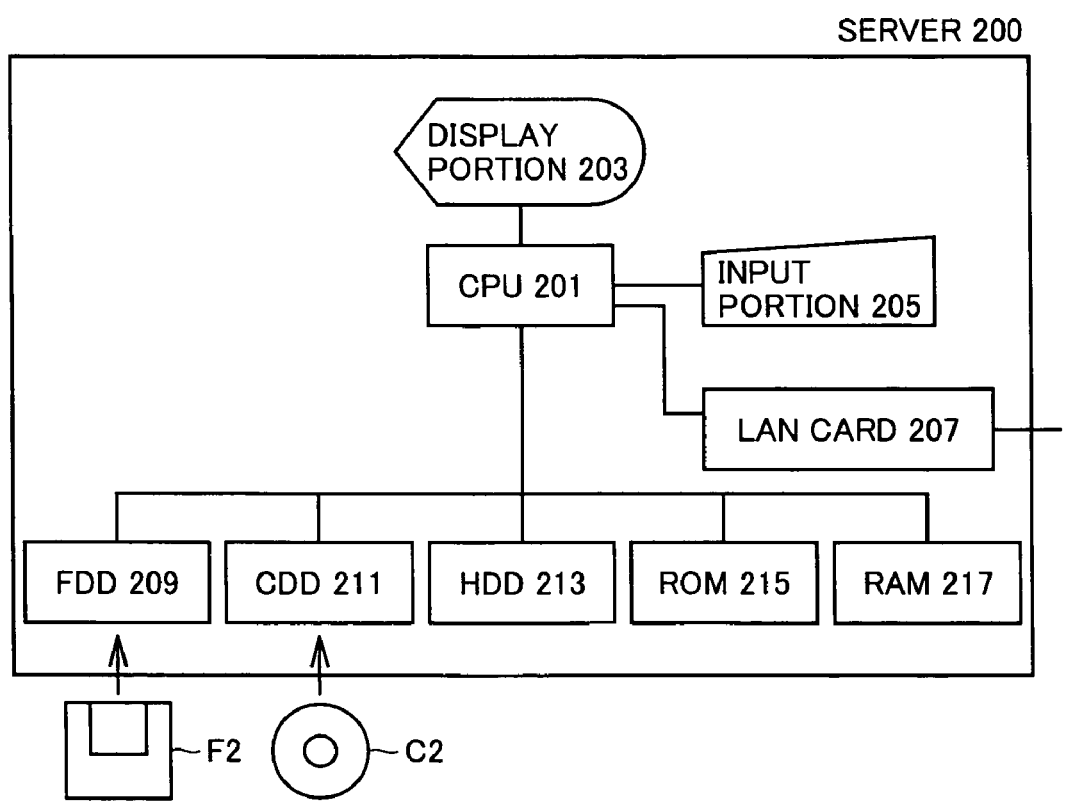
FIG. 22 is a block diagram representing a hardware configuration of a server.

FIG. 22 is a block diagram representing a hardware configuration of the server in such a system.

Referring to the figure, a server 200 includes a CPU 201 for overall control of the apparatus, a display portion 203, an input portion 205 including a mouse or a keyboard, an LAN card 207 for connection to an LAN, a flexible disk drive 209, a CD-ROM drive 211, a hard disk drive 213, an ROM 215 and an RAM 217.

As in the client computer of FIG. 4, flexible disk drive 209 allows reading of image data or a program recorded on a flexible disk (F2), and CD-ROM drive 211 allows reading of image data or a program recorded on a CD-ROM (C2).

Figure 23:
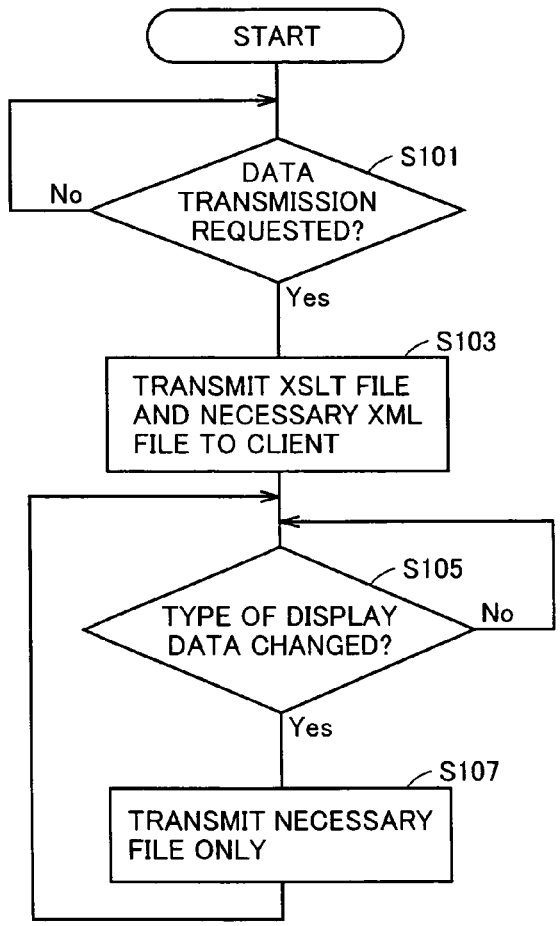
FIG. 23 is a flow chart representing a process performed by the server shown in FIG. 22.

FIG. 23 is a flow chart representing a process performed by the server of FIG. 22.

Referring to the figure, in step S101, whether a data transmission request is issued from a client connected to the network or not is determined. If it is YES, an XSLT file and a necessary XML file are transmitted to the client in step S103.

In step S105, whether the type of display date has been changed or not is determined, and if it is YES, only the XML file that corresponds to the selection is transmitted in step S107.

[Fourth Modification]

In the fourth modification, as in the network shown in FIG. 1, management information such as operation status or method of paper feed of MFP 100 is transmitted over the network using XML and XSLT, and displayed by the browser on PC 300a or 300b. Specifically, upon request from PC 300a or 300b, MFP 100 transmits XML files (language data file, setting file and device status file indicating the status of the device) and an XSLT file to PC 300a or 300b. Based on the transmitted files, the browser software of PC 300a or 300b displays the management information of MFP 100.

More specifically, MFP 100 records a plurality of XML files (language data files) defining by XML items to be displayed by the browser, an XML file (setting file) defining the file names of these as XML data, and an XSLT file (style definition file) having a mechanism of switching the defined files, and hence MFP 100 has a function of switching, by XSLT, the language data file to be used. Further, device status can be obtained from the device status file, and at the same time, the device status file identifies a portion to be displayed among the contents of the language data file.

In order to enable such identification, each of the plurality of language data files has the same structure (here, tree structure), holds device information as tag attribute, and records, for the tag, contents corresponding to the language and attribute of the language data file.

Figure 24:
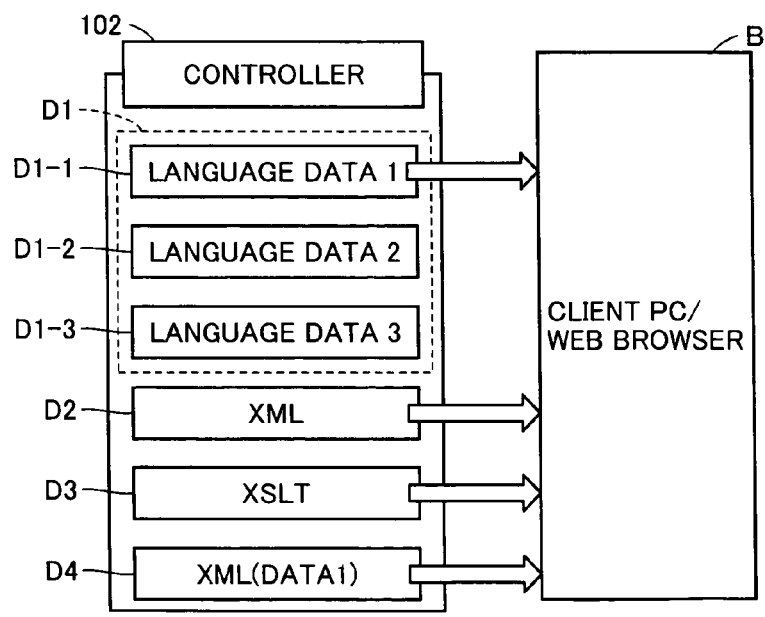
FIG. 24 schematically shows flow of information transmitted from MFP 100 to PCs 300a and 300b of FIG. 1, in accordance with a fourth modification.

FIG. 24 schematically shows flow of information transmitted from MFP 100 of FIG. 1 to PCs 300a and 300b.

Referring to the figure, MFP 100 has a controller, and management data and the like of MEP 100 are transmitted to a browser B of PC 300a or 300b in XML and XSLT formats, using a WWW server. MFP 100 has language data file D1 (XML file), setting file D2 (XML file), style definition file D3 (XSLT file) and device status file D4 (XML file) recorded therein, and language data file D1 includes a plurality of files (language data files D1-1, D1-2, D1-3) to handle a plurality of languages.

Data transmitted from MFP 100 to PC 300a or 300b includes setting file D2, style definition file D3, device status file D4 and one of language data files D1.

When MFP 100 is accessed by the browser B, browser B first identifies style definition file D3 and checks the contents of setting file D2, so as to select a necessary language data file from the plurality of language data files, and takes in style definition file D3, setting file D2, device status file D4 and only the necessary language file D1 to PC 300a or 300b.

FIGS. 25 and 26 show specific examples of language data file D1 recorded in MFP 100.

The files of FIGS. 25 and 26 will be referred to as XML1 and XML2 here, and the file names are assumed to be "English.xml" and "Japanese.xml", respectively.

XML1 shown in FIG. 25 is a file for displaying menu or device status described in English, while XML2 shown in FIG. 26 is a file for displaying menu or device status described in Japanese.

Specifically, words "Print", "Ready", "Error", "Enable" and "Disable" used for menu display in FIG. 5 are replaced by Japanese words "プリント", "レディ", "エラー", "有効" and "無効" in FIG. 26. By using either of these two language data files, display in English or Japanese can be presented.

Each of the plurality of language data files has the same tree structure. Specifically, both in FIGS. 25 and 26, elements indicated by the <Print> tag, <Status> tag, and <Select> tag are represented in nested manner, between <MFP> start and end tags. As to the <Item> tag as the content of <Status> tag, contents corresponding to the attribute (data)="Ready" and "Error" are described in the corresponding language. Similarly, as to the <Item> tag as the content of <Select> tag, contents corresponding to the attribute (data)="Enable" and "Disable" are described in the corresponding language.

Though two language data files are used here, other language data files such as Chinese or French may be prepared separately and added to the language data files, and the number of language data files is not limited.

FIG. 27 shows a specific example of setting file D2 recorded in MFP 100.

The file of FIG. 27 is referred to as XML3 here, of which name is assumed to be "Langugage.xml."

Similar to the example described with reference to FIG. 7, in setting file D2 shown in FIG. 27 also, the numeral portion of <Set>1</Set> in the setting file represents language file of which order is to be displayed next. When English is selected, "1" is recorded, and when Japanese is selected, "2" is recorded in the example of FIG. 27.

In the portion between the tags <Language> and </Language>, file name of the language data file (FIGS. 25 and 26) is recorded, which enables selection of the language data file to be used for display.

FIG. 28 shows a specific example of device status file D4 recorded in MFP 100.

The file shown in FIG. 28 is referred to as DATA1 here, of which file name is assumed to be "data.xml."

This is a file of which contents are automatically updated in accordance with the device status, in order to represent the status of the device. Here, "Ready" or "Error" is described reflecting the status of the device at the portion of <Status> tag, and at the portion of <Function> tag, "Enable" or "Disable" is described reflecting the status of the device. In this example, "Ready" and "Enable" are described, respectively.

FIG. 29 shows a specific example of style definition file D3 recorded in MFP 100.

The file of FIG. 29 is referred to as XSLT here, of which file name is assumed to be "data.xsl."

Referring to the figure, the portion indicated by (1) is for automatically selecting the language data file of the currently set language. This expression (1) enables acquisition of contents of the <Language> tag in the order indicated by <Set> tag of Language.xml (FIG. 27). Specifically, here, among the files indicated by <Language> tag, English.xml as the file of the first order is taken. The taken data is turned to a variable "Language", which can be utilized later as $Language.

The portion indicated by (2) of FIG. 29 is for displaying the contents of <Print> tag of the file (here, English.xml) indicated by $Language, through Document function.

The portion indicated by (3) of FIG. 29 is for storing contents indicated by the <Status> tag of DATA1 (data.xml), in variable X.

The portion indicated by (4) of FIG. 29 is for displaying the contents of the Item tag of which attribute data is "X" (here, "Ready"), among the contents of <Status> tag of the file indicated by $Language through Document function (here, English.xml). This portion provides the display "Ready."

The portion indicated by (5) of FIG. 29 is for storing the contents indicated by <Function> tag of DATA1 (data.xml) in variable Y. As shown in FIG. 28, here, "Enable" is stored in "Y".

The portion indicated by (6) of FIG. 29 is for displaying a select box, in such a state that the content of <Item> tag of which attribute data is the variable Y (here, "Enable") is selected among the contents of <Select> tag of the file indicated by $Language (here, English.xml).

The number (numeral) as the data of the <Set> tag in the setting file (FIG. 27) is related to the order of <Language> tag. It is noted that in order to set the numeral in <Set> tag, CGI (common gateway interface) is used. This is the same as in the example of FIG. 7.

Figure 30:
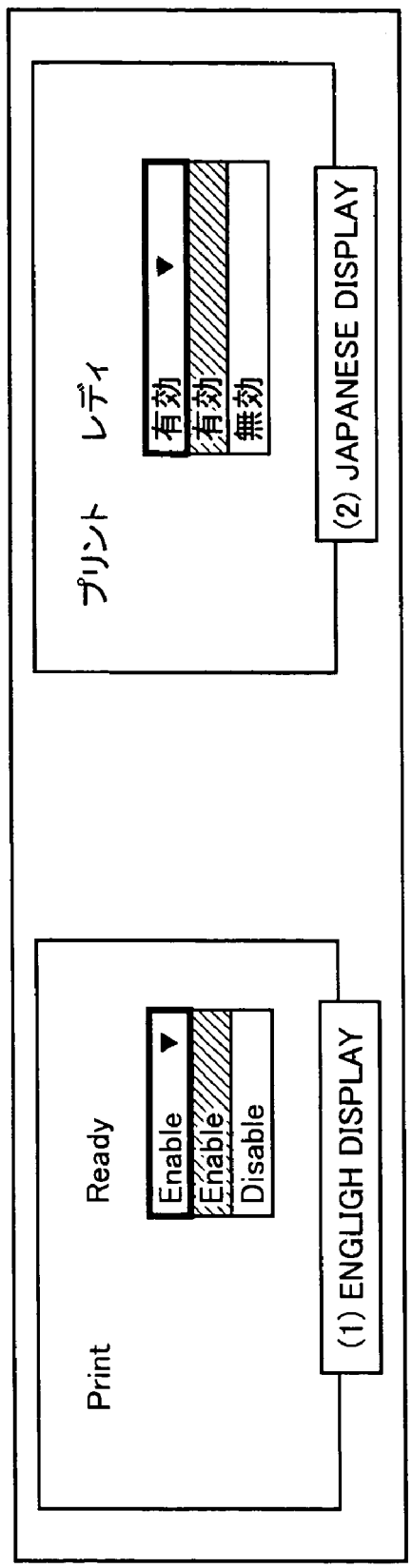
FIG. 30 represents exemplary displays on display portion 303 of PC 300a or 300b.

FIG. 30 shows exemplary display on display portion 303 of PC 300a or 300b.

As can be seen from "(1) English display" on the left side of FIG. 30, as "1" is set in the <Set> tag of the setting file (FIG. 7), "English.xml" indicated by the first <Language> tag is selected, and therefore, the contents of XML1 of FIG. 25 appears on the screen (English display).

Further, for the display, device status file D4 (DATA1) is referred to, and therefore, contents of XML1 are displayed based on the description of device status file D4.

When the user changes the display language from English to Japanese in the state of FIG. 30 (1), CGI sets "2" in the <Set> tag of the setting file (FIG. 27), and therefore, "Japanese.xml" indicated by the second <Language> tag is selected. Consequently, the contents of XML2 appear on the screen ("(2) Japanese display" on the left side of FIG. 30). In this manner, switching of display language can be done with small amount of data.

Specifically, when English has been selected as the display language as shown in FIG. 27, XML1 (English.xml) is automatically applied as there are descriptions (1) to (6) in XSLT of FIG. 29 and "(1) English display" of FIG. 30 is displayed on the screen by the browser. At this time, files necessary for display are XML1, XML3, DATA1 and XSLT.

When the display language is changed to Japanese, "2" is set in the <Set> tag of XML3, and therefore, display is switched to Japanese display using XML2 (Japanese.xml) and "(2) Japanese display" of FIG. 30 is displayed on the screen by the browser, without the necessity of changing XSLT. At this time, files necessary for display are XML2, XML3, DATA1 and XSLT.

Therefore, when the display language is changed from English to Japanese, the file that is newly downloaded is XML2 only. Thus, the amount of data to be transmitted can be reduced.

[Fifth Modification]

In the fourth modification above, the language used for display is changed by the file XML3. With regard to the change in contents to be displayed, the present invention is also applicable to change between display files for adults and for children, display files for general users and for administrators, or display files for beginners and advanced learners, and so on.

In the following, an example will be described in which contents of error message is changed by switching between display files for general users and for an administrator, where the error message is displayed in accordance with an error code.

FIGS. 31 and 32 show specific examples of error message data file D1 recorded in a device such as MFP 100.

Files of FIGS. 31 and 32 will be referred to as XML1 and XML2 here, and the file names are assumed to be "User.xml" and "Admin.xml", respectively. The former is a display file for a general user, and the latter is a display file for an administrator.

Specifically, the contents indicated by <Message> tag used for display in FIG. 31 is replaced by more detailed contents in FIG. 32. By using either one of these two error messages, a display for a general user or for an administrator can be presented.

Each of the plurality of error message data files has the same tree structure. Specifically, both in FIGS. 31 and 32, elements indicated by the <ErrorItem> tag and <Message> tag are represented in nested manner, between <MFP> start and end tags. As the content of <ErrorItem> tag, contents corresponding to each <Item> tag of the attribute name="IPAdd" and "SubnetMask" are described. Similarly, as the content of <Message> tag, contents corresponding to <Item> tag of attribute name="Ok_1", "Str_1", "Str_2", "Str_3" and "Err_2" are described, respectively.

Though two error message data files are used here, other error message data files may be prepared separately and added, and the number of error message data files is not limited.

FIG. 33 shows a specific example of setting file D2 recorded in a device.

The file of FIG. 33 will be referred to as XML3 here, of which file name is assumed to be "System.xml."

As in the example described with reference to FIG. 7, the numeral portion of <Set>1</Set> in the setting file represents language file of which order is to be displayed next. When a display file for a general user (ser.xml) is selected, "1" is recorded, and when a display file for an administrator (Admin.xml) is selected, "2" is recorded in this portion, in the example shown in FIG. 33.

Between the tags <Kind> and </Kind>, file name of the error message data file (FIGS. 31 and 32) is recorded, and this allows selection of the error message data file to be used for display.

FIG. 34 shows a specific example of device status file D4 recorded in a device.

The file of FIG. 34 will be referred to as DATA1 here of which file name is assumed to be "error.xml."

This is a file of which contents are automatically updated in accordance with the device status, in order to represent the error status of the device. Here, any of the error codes "Ok_1", "Str_1", "Str_2", "Str_3" and "Err_2" is described as attribute Code, reflecting the status of the device at the portion of <Item> tag in <Message> tag. Further, as the contents of <Item> tag, either "IPAdd" or "SubnetMask" is described. In this manner, it becomes possible to describe either one of, or both of IPAdd (IP address) and SubnetMask (subnet mask) statuses.

FIG. 35 shows a specific example of style definition file D3 recorded in a device.

The file of FIG. 35 is referred to as XSLT here, of which file name is assumed to be "error.xsl."

Referring to the figure, the portion indicated by (1) is for automatically selecting the currently set error message data file. This expression (1) enables acquisition of data of the <Kind> tag in the order indicated by <Set> tag of System.xml (FIG. 33). Specifically, here, among the files indicated by <Kind> tag, User.xml as the file of the first order is taken. The taken data is turned to a variable "Display", which can be utilized later as $Display.

The portion indicated by (2) of FIG. 35 is for storing contents indicated by the first <Item> tag of error.xml, in variable Me. As can be seen from FIG. 34, here, "IPadd" is stored in "Me."

The portion indicated by (3) of FIG. 35 is for storing the value of attribute Code of the first <Item> of error.xml in variable Co. As can be seen from FIG. 34, here, "Str_1" is stored in "Co."

The portion (4) of FIG. 35 is for displaying the contents of Item tag of which attribute is "Me" (here, "IPAdd"), among the contents of <ErrorItem> tag of the file (here, User.xml) indicated by $Display, through Document function. This portion provides display of "IP address."

The portion (5) of FIG. 35 is for displaying the contents of Item tag of which attribute is "Co" (here, "Str_1"), among the contents of <Message> tag of the file (here, User.xml) indicated by $Display, through Document function. This portion provides display of "Not input yet."

Thereafter, by the expression (2), the contents of the next <Item> tag of error.xml ("SubnetMask") is stored in variable Me, and by the expressions (3) and the following, the value ("Str_3") of attribute Code of the second <Item> tag of error.xml is stored in variable Co. Among the contents of the <ErrorItem> tag of User.xml, content ("Subnet mask") of the Item tag of which attribute is "SubnetMask" is displayed, and among the contents of <Message> tag of User.xml, content ("Input character not correct") of the Item tag of which attribute is "Str_3" is displayed.

FIG. 36 shows the contents displayed by the files shown in FIGS. 31 to 35 through the process described above.

Here again, when the display is to be changed to the one for an administrator, "2" is set in <set> tag of XML3, and the display is switched to the one corresponding to XML2 (Admin.xml), without changing XSLT.

[Others]

It is noted that a program for executing the process represented by the flow charts of the above described embodiment can be provided, and such a program may be recorded on a recording medium such as a CD-ROM, a flexible disk, a hard disk, an ROM, an RAM or a memory card, to be delivered to a user.

Further, the program may be downloaded to an apparatus through a communication network including the Internet.

The present invention is not limited to the embodiments described above, and the present invention is applicable to any system that displays a file, no matter whether the system is connected or not connected to a network environment. Specifically, the present invention is applicable even to a PC not connected to a network, which reads contents of a recording medium such as a hard disk using a browser.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data display system including a client computer and a server connected through a network, comprising:
 a first memory, provided at the server, storing a plurality of data definition files of a first type defining contents of data to be displayed on said client computer;
 a second memory provided at the server, storing a data definition file of a second type defining, as data, file names of said data definition files of the first type;
 a third memory, provided at the server, storing a style definition file, defining a style for displaying said data definition file, and switching a file to be displayed among said plurality of data definition files of the first type by using said data definition file of the second type;
 browser device of the client computer identifies the style definition file, checks contents of the data definition file of the second type and selects one of the data definition files of the first type and downloads the same to the client computer; and
 a display displaying data on the client computer using the files downloaded by the browser device from said first, second and third memories, wherein, when the contents of data to be displayed are updated, the browser device newly downloads only one of the data definition files of the first type and updates the contents of data to be displayed, thereby the display on the client computer being switchable from one display data of one language to another display data of another language without the necessity of changing the style definition file.

2. The data display system according to claim 1, wherein display language is switched by switching a file used for display by said style definition file.

3. The data display system according to claim 1, wherein by using said data definition file of the second type in said client computer, a menu for selecting a file used for display is displayed; and
 by receiving a user's selection through said menu, the file used for display is switched.

4. The data display system according to claim 1, wherein said data definition file is XML and said style definition file is XSLT.

5. The data display system according to claim 1, further comprising:
 a fourth memory storing a data definition file of a third type defining a portion to be displayed among contents of the data of said data definition files of the first type; wherein
 said display displays data in said client computer by using files stored in said first, second, third and fourth memories.

6. The data display system according to claim 5, wherein said data definition file of the third type describes device information; and
 each of said plurality of data definition files of the first type a) has same structure, b) holds the device information as tag attribute, and c) has a description corresponding to a characteristic of the data definition file of the first type including a description corresponding to a language of the data definition file of the first type.

7. A data output apparatus performing at least one of display output and external output of data, comprising:
 a first memory storing a plurality of data definition files of a first type defining contents of data to be displayed;
 a second memory storing a data definition file of a second type defining, as data, file names of said data definition files of the first type;
 a third memory storing a style definition file, defining a style for displaying a data definition file, and switching a file to be displayed among said plurality of data definition files of the first type by using said data definition file of the second type; and
 an output equipment outputting a) only one data definition file of the first type using the files stored in said first, second and third memories, b) the data definition file of the second type and c) the style definition file, wherein, when contents of data to be output are updated, the output equipment newly obtains from the first memory only one of the data definition files of the first type, and updates the contents of data to be output, thereby the output from the output equipment being switchable from one display data of one language to another display data of another language without the necessity of changing the style definition file.

8. The data output apparatus according to claim 7, further comprising
 a fourth memory storing a data definition files of a third type defining a portion to be displayed among contents of the data of said data definition file of the first type; wherein
 said output equipment outputs data using files stored in said first, second, third and fourth memories.

9. The data output apparatus according to claim 8, wherein said data definition file of the third type describes device information; and
 each of said plurality of data definition files of the first type a) has same structure, b) holds the device information as tag attribute, and c) has a description corresponding to a characteristic of the data definition file of the first type including a description corresponding to a language of the data definition file of the first type.

10. An image forming apparatus having a communication function, comprising the data output apparatus according to claim 7.

11. A data display apparatus displaying data downloaded from a server, wherein
said server stores a plurality of data definition files of a first type defining contents of data to be displayed, a data definition file of a second type defining, as data, file names of said data definition files of the first type, and a style definition file, defining a style for displaying a data definition file, and switching a file to be displayed among said plurality of data definition files of the first type by using said data definition file of the second type;
said data display apparatus comprising:
a receiver receiving only one file necessary for display among said data definition files of the first type, said style definition file and said data definition file of the second type; and
a display presenting a display using the files received by said receiver,
wherein, when contents of data to be displayed are updated, the receiver newly receives only one of the data definition files of the first type and updates the contents of data to be displayed, thereby the display of the display apparatus being switchable from one display data of one language to another display data of another language without the necessity of changing the style definition file.

12. The data display apparatus according to claim 11, wherein
said server further stores a data definition file of a third type defining a portion to be displayed among contents of the data of said data definition files of the first type; and
said receiver further receives said data definition file of the third type.

13. The data display apparatus according to claim 12, wherein
said data definition fib of the third type describes device information; and
each of said plurality of data definition file of the first type a) has same structure, b) holds the device information as tag attribute, and c) has a description corresponding to a characteristic of the data definition file of the first type including a description corresponding to a language of the data definition file of the first type.

14. A data display program product, displaying data downloaded from a sewer, wherein
said server stores a plurality of data definition files of a first type defining contents of data to be displayed, a data definition file of a second type defining, as data, file names of said data definition files of the first type, and a style definition file, defining a style for displaying a data definition file, and switching a file to be displayed among said plurality of data definition files of the first type by using said data definition file of the second type;
said data display program product causing a computer to execute
a receiving step of receiving only one file necessary for display among said data definition files of the first type, said style definition file and said data definition file of the second type, and
a display step of presenting a display using the files received in said receiving step,
wherein, when contents of data to be displayed are updated, the receiving step newly receives only one of the data definition files of the first type and updates the contents of data to be displayed, thereby the display of the display program product being switchable from one display data of one language to another display data of another language without the necessity of changing the style definition file.

15. The data display program product according to claim 14, wherein
said server further stores a data definition file of a third type defining a portion to be displayed among contents of the data of said data definition files of the first type; and
in said receiving step, said data definition file of the third type is further received.

16. The data display program product according to claim 15, wherein
said data definition file of the third type describes device information; and
each of said plurality of data definition files of the first type has same structure, holds the device information as tag attribute, and has a description corresponding to a characteristic of the data definition file including a description corresponding to a language of the data definition file.

* * * * *